United States Patent [19]

Ito et al.

[11] 4,279,560
[45] Jul. 21, 1981

[54] WORKPIECE TRANSFER APPARATUS FOR MACHINE TOOL

[75] Inventors: Teruyuki Ito, Nagoya; Yasuo Suzuki, Kariya, both of Japan

[73] Assignee: Toyoda Koki Kabushiki Kaisha, Kariya, Japan

[21] Appl. No.: 112,711

[22] Filed: Jan. 16, 1980

[30] Foreign Application Priority Data

Jan. 30, 1979 [JP] Japan .................................. 54-8742

[51] Int. Cl.³ ............................................. B23B 13/12
[52] U.S. Cl. ................................. 414/589; 414/591; 414/753; 212/128
[58] Field of Search ............... 414/589, 591, 751–753, 414/728, 744 R; 74/25, 27; 212/128, 213

[56] References Cited

U.S. PATENT DOCUMENTS

| | | |
|---|---|---|
| 3,572,520 | 3/1975 | Evans et al. |
| 3,658,190 | 4/1972 | Fournier .......................... 414/753 X |
| 3,731,820 | 5/1973 | Nike et al. .......................... 414/753 |
| 3,966,058 | 6/1976 | Heffron et al. .......................... 414/591 |

Primary Examiner—Leslie J. Paperner
Assistant Examiner—Terrance L. Siemens
Attorney, Agent, or Firm—Oblon, Fisher, Spivak, McClelland & Maier

[57] ABSTRACT

A workpiece transfer apparatus for transferring a workpiece for a machine tool. A first crank arm is rotatably supported and rotatably supports a planet gear engaging with a stationary gear and a driven gear engaging with the planet gear. A second crank arm is secured to the driven gear and fixedly supports a crank pin. A connecting member for lifting and lowering a workpiece grip device is pivotably connected to the crank pin. The crank pin has a cam member secured thereto. An operating member is provided with a cam follower engaging with the cam member and is operatively connected to the workpiece grip device for opening and closing the same in accordance with the shape of the cam member.

8 Claims, 10 Drawing Figures

FIG. 3

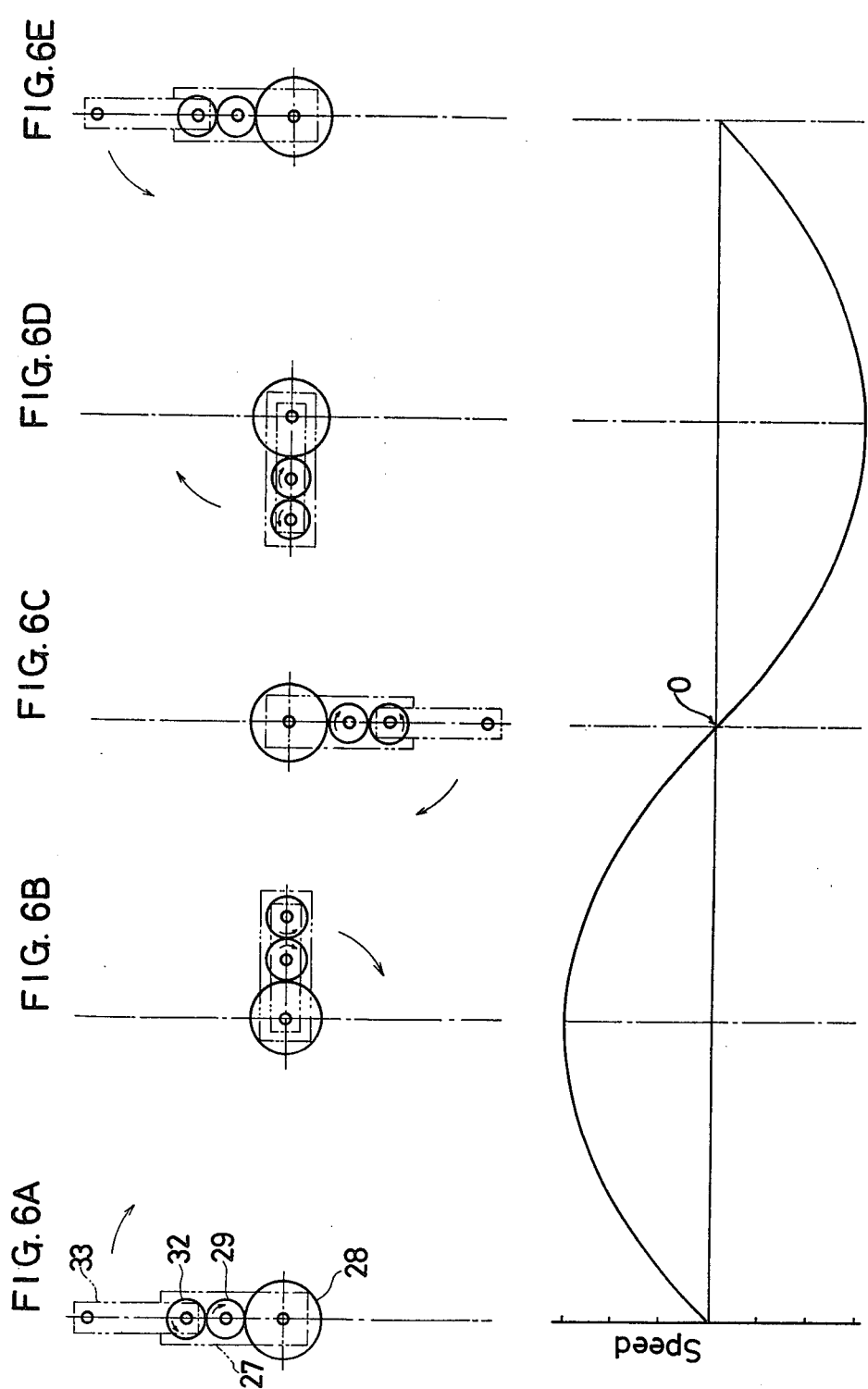

WORKPIECE TRANSFER APPARATUS FOR MACHINE TOOL

BACKGROUND OF THE INVENTION

1. Field of the Invention

The present invention relates to a workpiece transfer apparatus for loading and unloading a workpiece into and from a machine tool.

2. Description of the Prior Art

In the known workpiece transfer apparatus utilizing a single crank motion mechanism, the crank arm having the crank pin spaced a distance from the axis of the crank arm is rotated about its axis. The connecting member is pivotably connected at its one end to the crank pin and pivotably connected at its other end to the workpiece support device. The workpiece support device is moved straight along the guide device in accordance with the crank motion of the crank arm. With this arrangement, the distance between the axes of the crank arm and the crank pin has to be large enough to assure a predetermined straight stroke of the workpiece support device, which necessarily results in the larger width of the apparatus.

Furthermore, the workpiece support device is applied with a component force perpendicular to the direction of straight movement thereof during rotation of the crank arm, so that the guide device guiding the straight movement of the workpiece support device may lose its expected function.

SUMMARY OF THE INVENTION

It is an object of the present invention to provide a new and improved workpiece transfer apparatus which is compact in construction.

Another object of the present invention is to provide a new and improved workpiece transfer apparatus which is smooth and reliable in operation.

A further object of the present invention is to provide a new and improved workpiece transfer apparatus of the character set forth above, which utilizes a double crank motion mechanism.

Briefly, according to the present invention, these and other objects are achieved by providing a workpiece transfer apparatus for transferring a workpiece for a machine tool, as mentioned below. A cross-rail is horizontally arranged above the machine tool. A carrier body is supported on the cross-rail to be movable along the cross-rail. A stationary gear is fixedly mounted on a stationary shaft secured to the carrier body. A first crank arm is rotatably mounted on the stationary shaft. A drive device is provided to rotate the first crank arm. A planet gear is rotatably carried on the first crank arm and engages with the stationary gear. A driven gear is rotatably carried on the first crank arm and engages with the planet gear. A second crank arm is fixedly connected to the driven gear. A crank pin is fixedly secured to the second crank arm. A connecting member is pivotably connected at one end thereof to the crank pin. A lift device is vertically movably supported by the carrier body and operatively connected to the other end of the connecting member. A grip device is pivotably supported by the lift device for gripping or releasing the workpiece. A cam member is secured to the crank pin. An operating device is operatively connected to the grip device. A cam follower is mounted on the operating device and engaged with the cam member for opening and closing the grip device in accordance with the shape of the cam member.

In another aspect of the present invention, the diameter of the driven gear is half of that of the stationary gear. The distance between the axes of the crank pin and the driven gear is substantially equal to that between the axes of the driven gear and the stationary gear.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 3 is an enlarged sectional view taken along the lines III—III in FIG. 1;

FIGS. 6A to 6E show an operational relationship of the apparatus according to the present invention.

DETAILED DESCRIPTION OF THE PREFERRED EMBODIMENT

Figure 1:
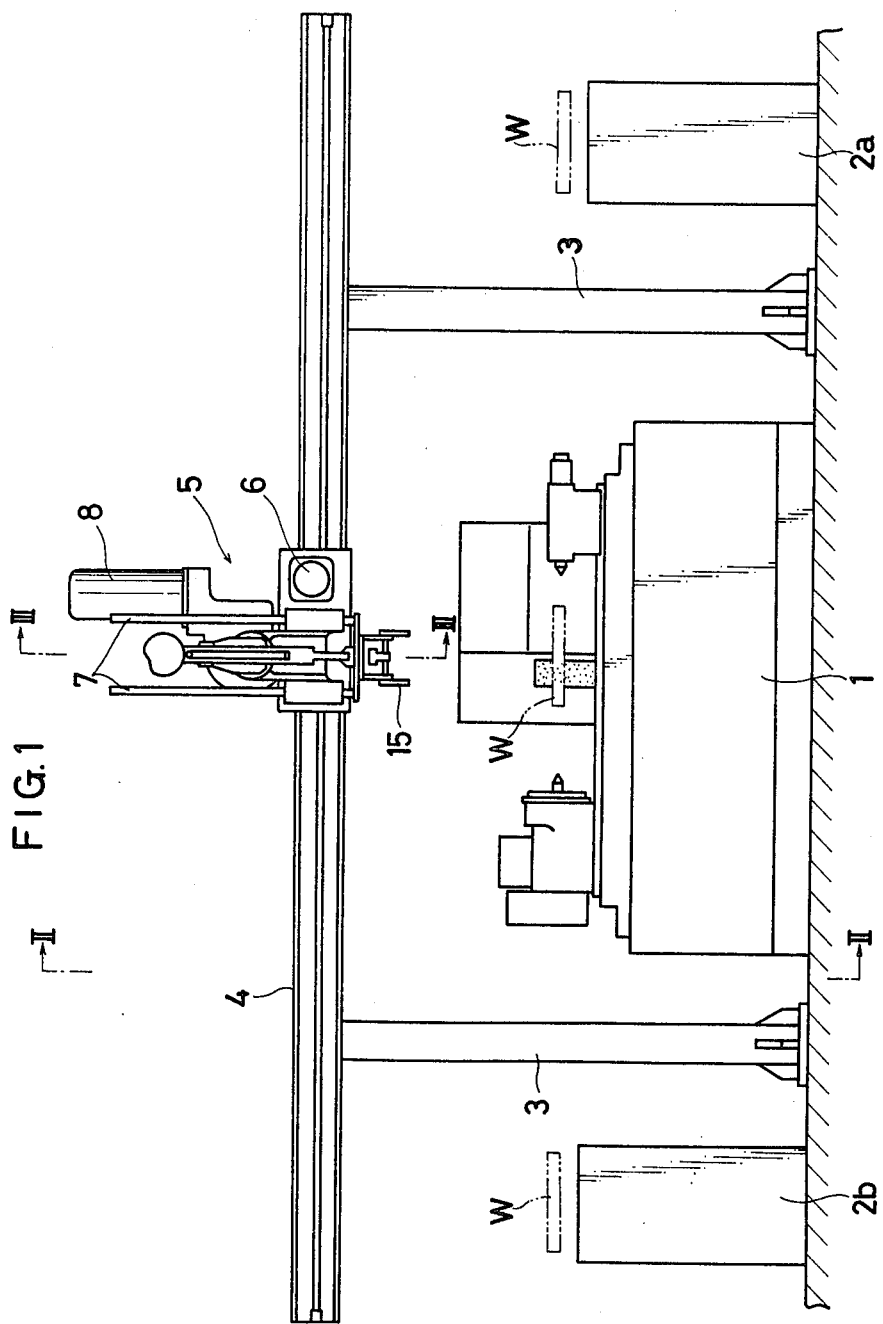
FIG. 1 is an elevational view of a workpiece transfer apparatus according to the present invention.
Figure 2:
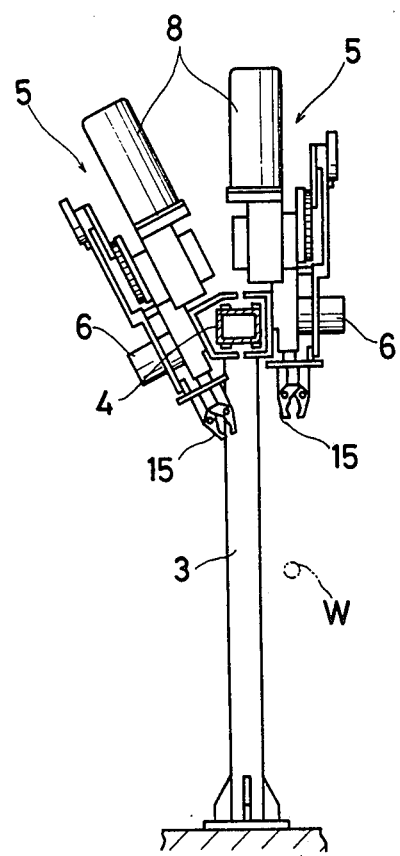
FIG. 2 is a side view taken along the lines II—II in FIG. 1.

Referring now to the drawings, wherein like reference numerals or characters refer to identical or corresponding parts throughout the several views, and more particularly to FIGS. 1 and 2, there is shown a machine tool, such as a grinding machine 1. A conveyor 2a for loading unfinished workpieces W is located at one side of the grinding machine 1, while a conveyor 2b for unloading finished workpieces W is located at the other side of the grinding machine 1. Upstanding columns 3 are arranged at opposite sides of the grinding machine 1 for mounting thereon a cross-rail 4 which horizontally extends above and from the loading conveyor 2a through the grinding machine 1 to the unloading conveyor 2b. A workpiece transfer apparatus 5 according to the present invention is carried on the cross-rail 4 to be horizontally movable along the cross-rail 4. The workpiece transfer apparatus 5 is constituted by two sets of the same construction, one being vertically arranged and the other being slanted, as shown in FIG. 2.

The detail of one of the workpiece transfer apparatus 5 will be hereinafter described with reference to FIGS. 3 to 5. The workpiece transfer apparatus 5 comprises a carrier body 9 to which a frame 10 is secured. The frame 10 is provided with guide rollers 11 by which the frame 10 or the carrier body 9 is movably supported by the cross-rail 4. To the frame 10 is secured a motor 6 whose output shaft has mounted thereon a sprocket wheel 13 which is engaged with a chain 12 secured to the cross-rail 4 in the longitudinal direction. Accordingly, activation of the motor 6 causes the frame 10 or the carrier body 9 to move horizontally along the cross-rail 4.

A pair of guide rods 7 are vertically movably guided by the carrier body 9 through housing members 7a secured thereto and provided at their lower ends with a plate member 14a from which a pair of vertical plate members 14 depend. A pair of grip members 15 are pivotably connected by hinge pins 16 to each of the vertical plate members 14. The pair of grip members 15 are formed with elongated slots 17 intersected with each other, into which is inserted a pin 18 connected to an operating member 19. A vertical shaft 20 for opening and closing the grip members 15 is slidably supported by a connecting member 40, which is described hereinafter, and slidably connected to the operating member 19. A spring 21 is interposed between the plate member 14a and the operating member 19 for rendering a contact pressure of a cam follower 36, as described later. A spring 22 is also interposed between the operating member 19 and the lower end of the shaft 20 for rendering a workpiece grip force.

Figure 4:
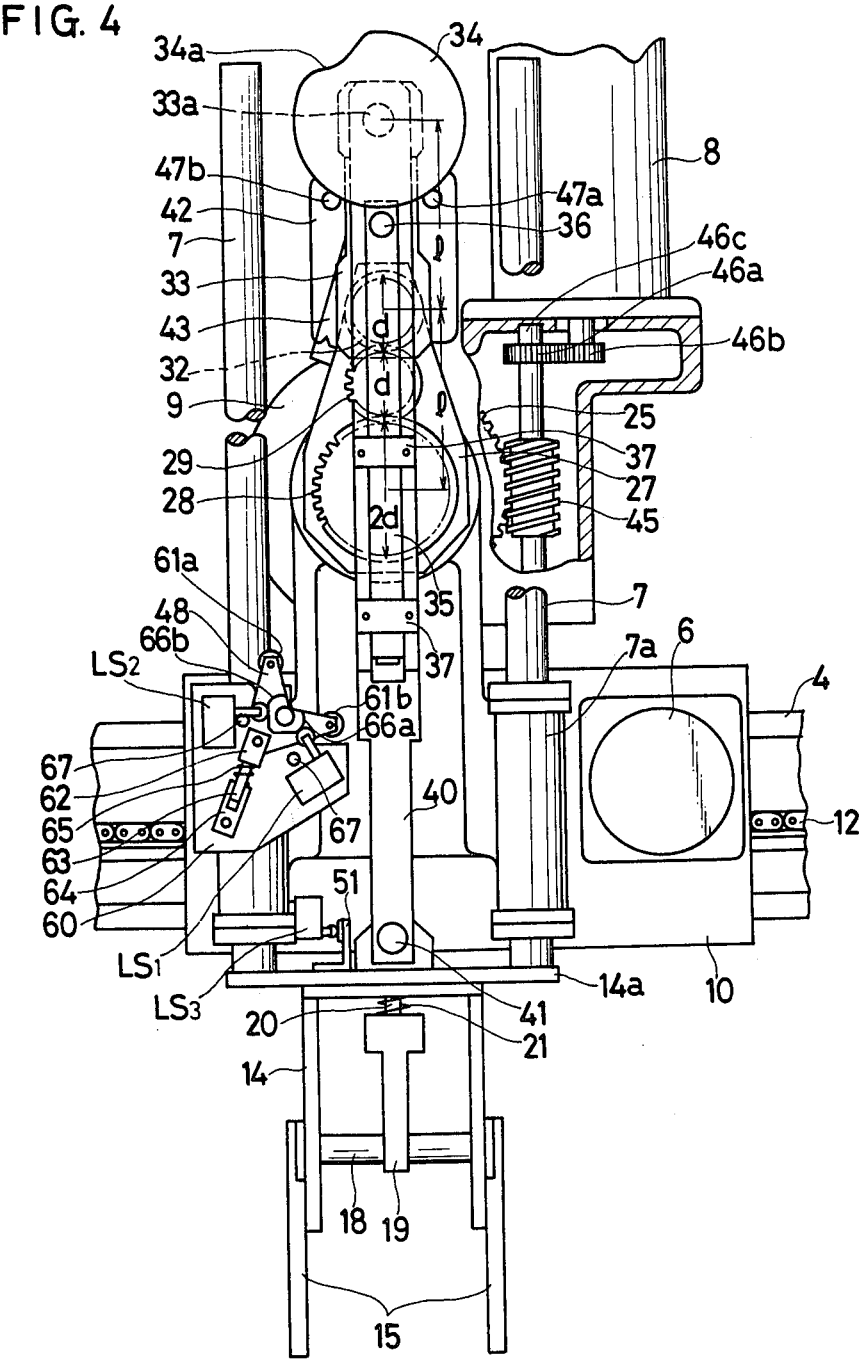
FIG. 4 is a view, partly in section, as viewed in the direction of an arrow IV in FIG. 3.

As shown in FIG. 4, a reversible drive motor 8 with brake function is mounted on the carrier body 9 for lifting and lowering the grip members 15. The output shaft of the motor 8 has secured thereon a gear 46b which is in meshing engagement with a gear 46a formed on a shaft 46c rotatably carried by the carrier body 9. The shaft 46c is also formed with a worm 45 in meshing engagement with a worm wheel 25 mounted on a sleeve shaft 24 through a key 26. The sleeve shaft 24 is rotatably supported by the carrier body 9. A stationary shaft 23 is fixedly connected to the carrier body 9 in concentric relationship with the sleeve shaft 24 and extends through the sleeve shaft 24. The stationary shaft 23 supports a stationary or sun gear 28 at its one end outside the sleeve shaft 24.

The sleeve shaft 24 has secured at its one end a crank arm 27 which rotatably carries through a shaft 30 a planet gear 29 in meshing engagement with the sun gear 28 supported by the stationary shaft 23. The crank arm 27 also has secured thereto in parallel relationship with the shaft 30 a shaft 31 on which a driven gear 32 is rotatably carried to engage with the planet gear 29. The relationship between the gears 28, 29 and 32 is such that the diameter of the driven gear 32 is equal to that of the planet gear 29 and half of that of the gear 28. Accordingly, when the planet gear 29 is rotated round the gear 28, the driven gear 32 is rotated about its axis twice as much as rotation of the planet gear 29 round the gear 28.

A crank arm 33 is integrally connected with the driven gear 32 and has fixed thereto a crank pin 33a. The distance between the axes of the crank pin 33a and the driven gear 32 is made substantially equal to that between the axes of the driven gear 32 and the gear 28. The crank pin 33a is formed at its one end with a cam member 34 whose periphery is substantially circular except at 34a where the cam member 34 is cut out in a proper cam shape. The connecting member 40 is pivotably connected at its one end to the crank pin 33a and pivotally connected at its other end to the plate member 14a by a pivot pin 41. An operating member 35 is vertically slidably received on the connecting member 40 by retaining plate 37. The operating member 35 is provided at its one end with the follower roller 36 engageable with the cam member 34 and pivotably connected at its other end to one end of a link member 38. The link member 38 is pivotably supported at its middle portion by the connecting member 40 by means of a pivot pin 39 and pivotably connected at its other end to the vertical shaft 20.

Figure 5:
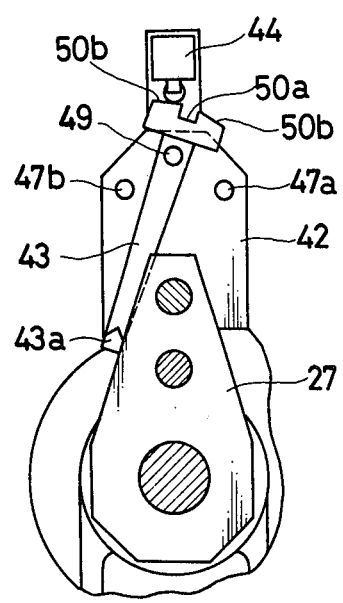
FIG. 5 is a sectional view taken along the lines V—V in FIG. 3.
Figure 3:
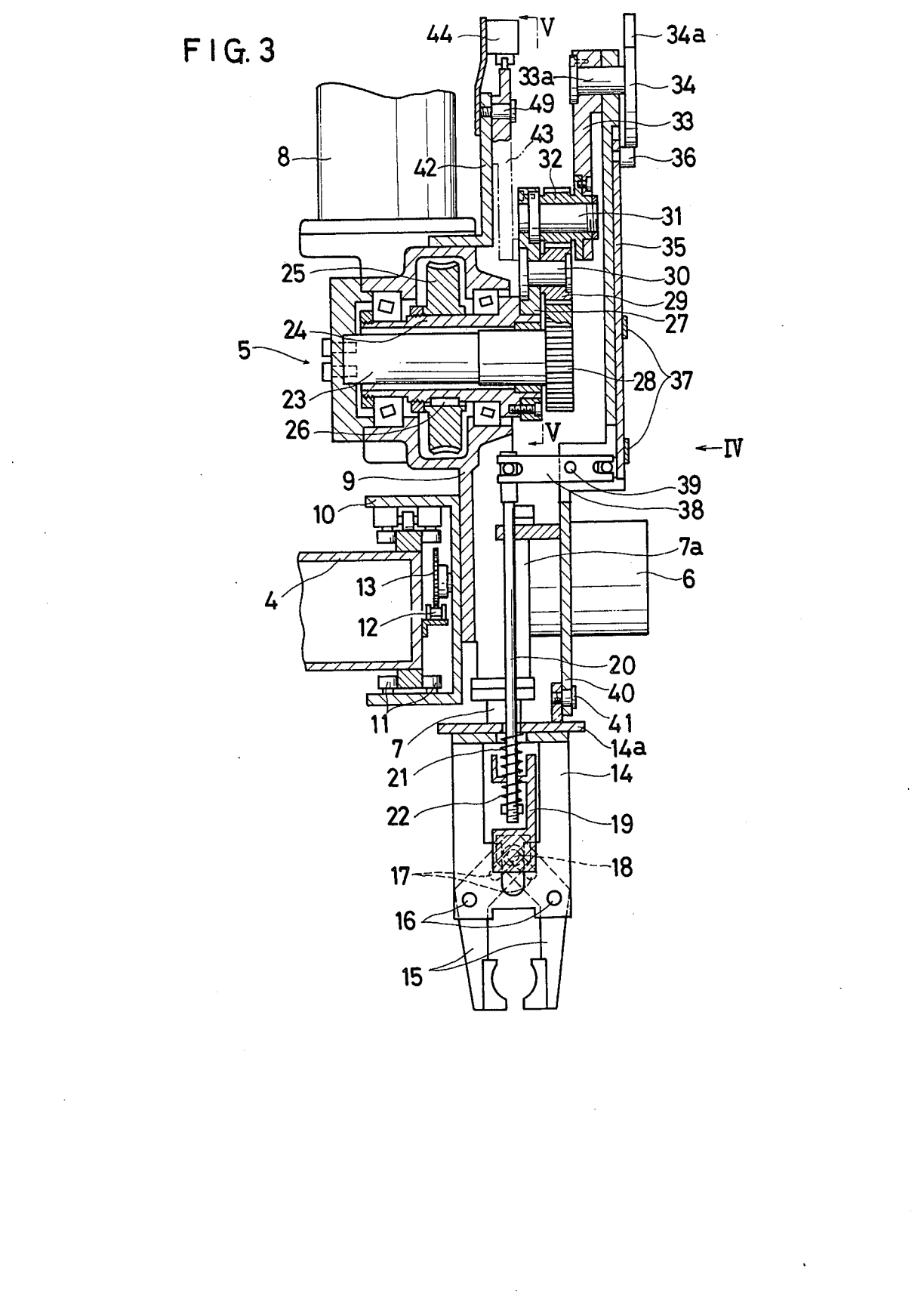

As shown in FIGS. 3 and 5, a bracket 42 is fixedly mounted on the top of the carrier body 9 and pivotably supports a stop arm 43 by means of a hinge pin 49. The stop arm 43 is provided at its one end with a projected portion 43a which is engageable with the side face of the crank arm 27 to be swung thereby. A pair of stop pins 47a and 47b are secured to the bracket 42 to restrict swinging movement of the stop arm 43 within a predetermined angular extent. The stop arm 43 is provided at its other end with a recessed or concave portion 50a enclosed by convex surfaces 50b. A limit switch 44 is mounted on the top portion of the bracket 42 at a position corresponding to the concave portion 50a of the stop arm 43 so as not to be normally actuated. When the crank arm 27 is overswung in either direction, the limit switch 44 is actuated by either of the convex surfaces 50b to confirm overswinging movement of the crank arm 27.

As shown in FIG. 4, a plate member 60 is fixedly mounted on the upper flange portion of one of the housing members 7a and rotatably supports a swing member 48. The swing member 48 rotatably carries two rollers 61a and 61b at two appexes of a triangle and pivotably supports an urging member 62 at the remaining apex of the triangle. The urging member 62 has a shaft portion 63 which is slidably received into a support member 64 pivotably mounted on the plate member 60. A compression spring 65 is interposed between the urging member 62 and the support member 64. The swing member 48 is formed round its rotational axis with two dog portions 66a and 66b for actuating limit switches LS1 and LS2 mounted on the plate member 60, respectively, to confirm a rotational direction of the crank arm 27. A pair of stop pins 67 are secured on the plate member 60 for restricting swinging movement of the swing member 48 within a predetermined angular extent. A limit switch LS3 is secured to the lower flange portion of one of the housing members 7a to be actuated by a dog 51 mounted on the plate member 14a for confirmation of the uppermost position of the plate member 14a.

In operation, one of the workpiece transfer apparatus 5 grips an unfinished workpiece W mounted on the loading conveyor 2a and loads the same into a machining position on the grinding machine 1. The other workpiece transfer apparatus 5 grips a finished workpiece W mounted on the grinding machine 1 and unloads the same onto the unloading conveyor 2b. During these loading and unloading operations, the grip members 15 are moved upward or downward, and opened or closed through the action of the crank arms 27 and 33, as schematically illustrated in FIGS. 6A to 6E.

When the grip members 15 are moved downward to grip the workpiece W on either the loading conveyor 2a or the grinding machine 1, the motor 8 is driven to rotate the crank arm 27 in a clockwise direction, as viewed in FIG. 4, through the gears 46b, 46a, the worm 45, the worm wheel 25 and the sleeve shaft 24. On the other hand, when the grip members 15 are moved downward to release the workpiece W on either the grinding machine 1 or the unloading conveyor 2b, the motor 8 is reversely driven to rotate the crank arm 27 in a counterclockwise direction, as viewed in FIG. 4.

When the crank arm 27 is rotated clockwise from its original position shown in FIGS. 4 and 6A, the planet gear 29 is rotated clockwise round the gear 28, while rotating clockwise about its own axis. Accordingly, the driven gear 32 is rotated counterclockwise. Since the diameter of the driven gear 32 is half of that of the gear 28 and the distance between the crank pin 33a and the driven gear 32 is equal to that between the driven gear 32 and the gear 28, the crank pin 33a is moved vertically without any guide, while being rotated about its axis, when the driven gear 32 is rotated. This assures a smooth and reliable guidance of the housing members 7a for the guide rods 7. When the crank arm 27 is rotated 90 degrees from its original position into a position shown in FIG. 6B, the crank arm 33 is superposed on the crank arm 27. Accordingly, the workpiece transfer apparatus is made compact in width. During this movement of the crank arm 27, the crank pin 33a is moved vertically downward while being rotated, so that the plate members 14 and the grip members 15 are also moved downward through the connecting member 40 in the vertical direction. Until the crank arm 27 or the crank arm 33 is rotated a predetermined angle, the follower roller 36 continues to engage with the circular periphery of the cam member 34 so as to maintain the grip members 15 in a closed state. Just before the crank arm 27 or the crank arm 33 is rotated 180 degrees, the follower roller 36 engages with the cam surface 34a of the cam member 34, so that the operating member 35 is moved upwardly relative to the connecting member 40. Accordingly, the shaft 20 is moved downwardly through the link member 38, thereby moving the pin 18 downwardly through the operating member 19 to open the grip members 15. When the crank arm 27 or the crank arm 33 is rotated 180 degrees, as shown in FIG. 6C, the grip members 15 are moved down into its lowermost position and the follower roller 36 reengages with the circular periphery of the cam member 34 to close the grip members 15, thereby gripping the workpiece W on either the loading conveyor 2a or the grinding machine 1.

When the crank arm 27 is further rotated clockwise from its 180-degree position shown in FIG. 6C, the crank pin 33a is moved vertically upwardly, so that the grip members 15 are also moved upwardly to lift up the workpiece grasped thereby. During this movement, the side portion of the crank arm 27 is moved into abutting engagement with the roller 61a of the swing member 48 to rotate the same counterclockwise, as viewed in FIG. 4. Accordingly, the limit switch LS2 is actuated by the dog portion 66b of the swing member 48 to thereby confirm the clockwise rotation of the crank arm 27, as viewed in FIG. 4, to command to the motor 8 the direction of rotation thereof in a subsequent operation. The counterclockwise rotation of the swing member 48 is restricted by the stop pin 67 and held in abutting engagement therewith by the action of the compression spring 65 until the swing member 48 is rotated clockwise by the counterclockwise rotation of the crank arm 27.

When the crank arm 27 is rotated 360 degrees into its original position, as shown in FIG. 6E, the limit switch LS3 is actuated by the dog 51 to confirm the uppermost position of the plate member 14a. The limit switch LS3, when actuated, causes the motor 8 to be braked and stopped at a predetermined position. When the crank arm 27 is over-rotated clockwise, the limit switch 44 is actuated by the convex surface 50b to confirm the over-rotation of the crank arm 27.

The speed of upward or downward movement of the grip member 15 is optimumly changed in accordance with a sine curve, as shown in FIGS. 6A to 6C.

Obviously, numerous modifications and variations of the present invention are possible in light of the above teachings. It is to be understood, therefore, that within the scope of the appended claims, the invention may be practiced otherwise than as specifically described herein.

What is claimed is:

1. A workpiece transfer apparatus for transferring a workpiece for a machine tool comprising:
   a cross-rail horizontally arranged above said machine tool;
   a carrier body supported on said cross-rail to be movable along said cross-rail;
   a stationary shaft secured to said carrier body;
   a stationary gear fixedly mounted on said stationary shaft;
   a first crank arm rotatably mounted on said stationary shaft;
   means for rotating said first crank arm;
   a planet gear rotatably carried on said first crank arm and engaging with said stationary gear;
   a driven gear rotatably carried on said first crank arm and engaging with said planet gear;
   a second crank arm fixedly connected to said driven gear;
   a crank pin fixedly secured to said second crank arm;
   a connecting member pivotably connected at one end thereof to said crank pin;
   lift means vertically movably supported by said carrier body and operatively connected to the other end of said connecting member;
   grip means pivotably supported by said lift means for gripping or releasing said workpiece;
   a cam member secured to said crank pin;
   operating means operatively connected to said grip means; and
   a cam follower mounted on said operating means and engaged with said cam member for opening and closing said grip means in accordance with the shape of said cam member.

2. A workpiece transfer apparatus as claimed in claim 1, wherein the diameter of said driven gear is half of that of said stationary gear, and the distance between the axes of said crank pin and said driven gear is substantially equal to that between the axes of said driven gear and said stationary gear.

3. A workpiece transfer apparatus as claimed in claim 2, wherein said rotating means comprises:
   a reversible motor mounted on said carrier body;
   a worm drivingly connected to said motor;
   a worm wheel in meshing engagement with said worm; and
   a sleeve shaft rotatably mounted on said carrier body in concentric relationship with said stationary shaft and securedly connected to said first crank arm.

4. A workpiece transfer apparatus as claimed in claim 2, wherein said operating means comprises:
   an operating member vertically slidably guided on said connecting member and having said follower roller at one end thereof;
   a link member pivotably supported by said connecting member and pivotably connected at one end thereof to the other end of said operating member;
   a vertical shaft slidably supported by said connecting member and pivotably connected at one end thereof to the other end of said link member; and
   an operating member resiliently connected at one end thereof to the other end of said vertical shaft and pivotably connected at the other end thereof to said grip means.

5. A workpiece transfer apparatus as claimed in claim 2, further comprising stop means for preventing overswinging movement of said first crank arm.

6. A workpiece transfer apparatus as claimed in claim 5, wherein said stop means comprises:
   a stop arm pivotably mounted on said carrier body and engageable at one end thereof with said first crank arm to be swung thereby; and
   a pair of stop pins secured to said carrier body to restrict swinging movement of said stop arm within a predetermined angular extent.

7. A workpiece transfer apparatus as claimed in claim 2, further comprising means for confirming a rotational direction of said first crank arm.

8. A workpiece transfer apparatus as claimed in claim 7, wherein said confirming means comprises:
   a swing member rotatably supported by said carrier body;
   a pair of rollers rotatably carried on said swing member, one being engageable with said first crank arm when said first crank arm is rotated in one direction and the other being engageable with said first crank arm when said first crank arm is rotated in the other direction;
   means for maintaining said swing member in two angular positions; and
   a pair of limit switches adapted to be actuated in accordance with a swing movement of said swing member for confirming a rotational direction of said first crank arm.

* * * * *